Figure 1:
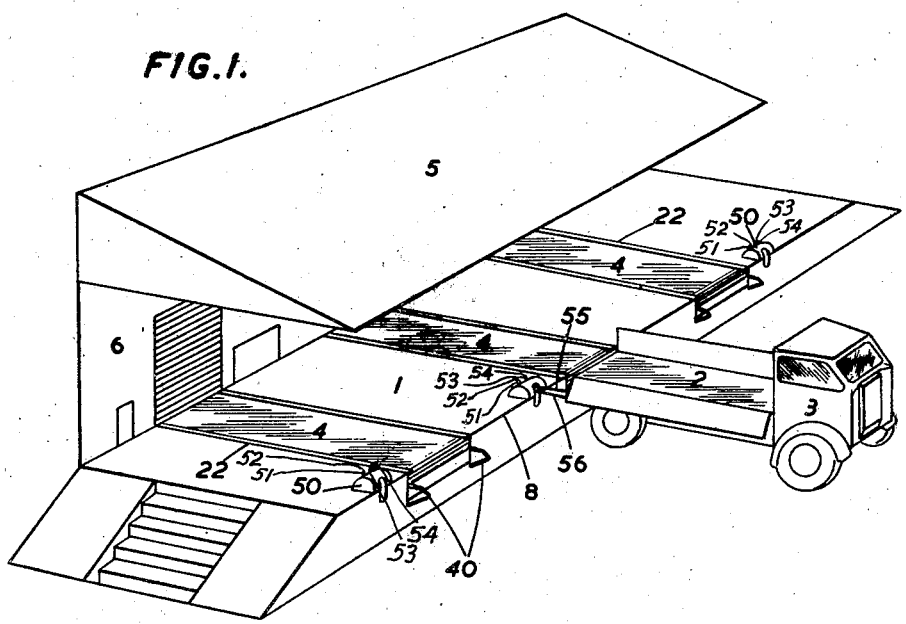

INVENTOR
JAMES AITKEN KINNAIRD
BY
Ernest J. Mechlin
HIS ATTORNEY.

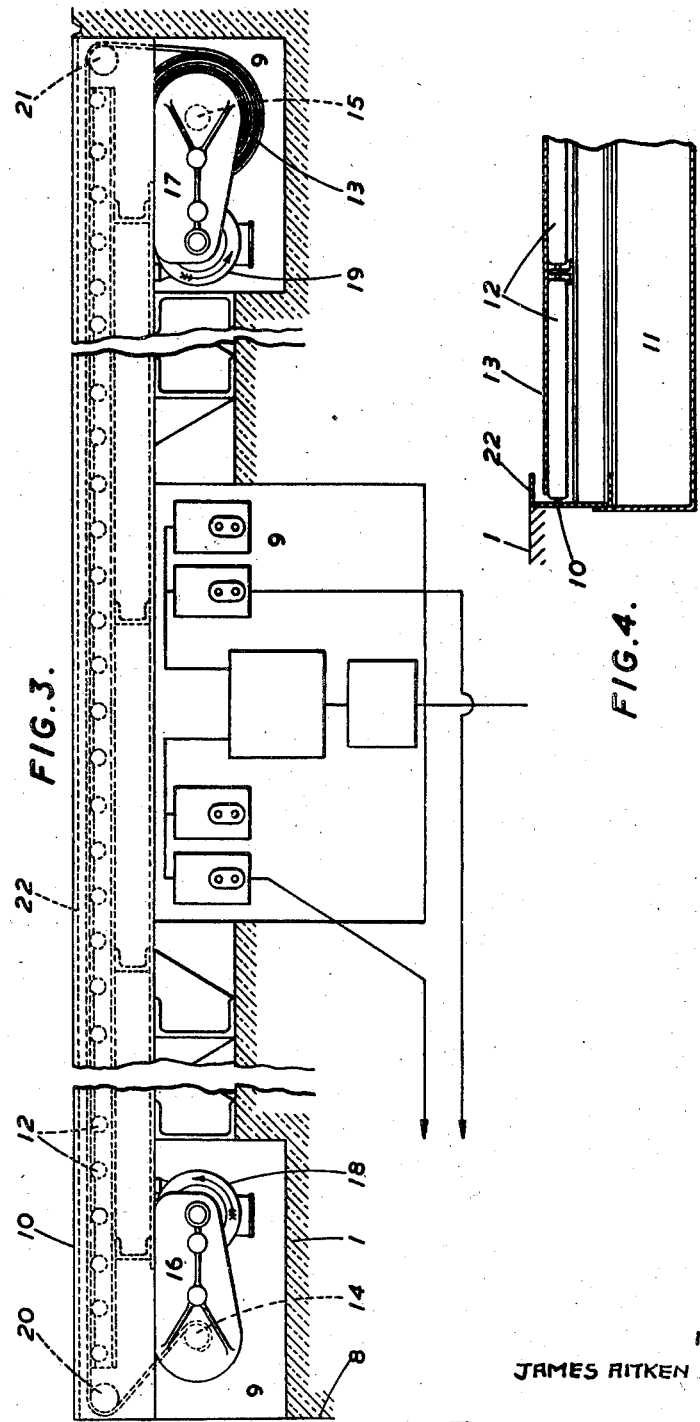

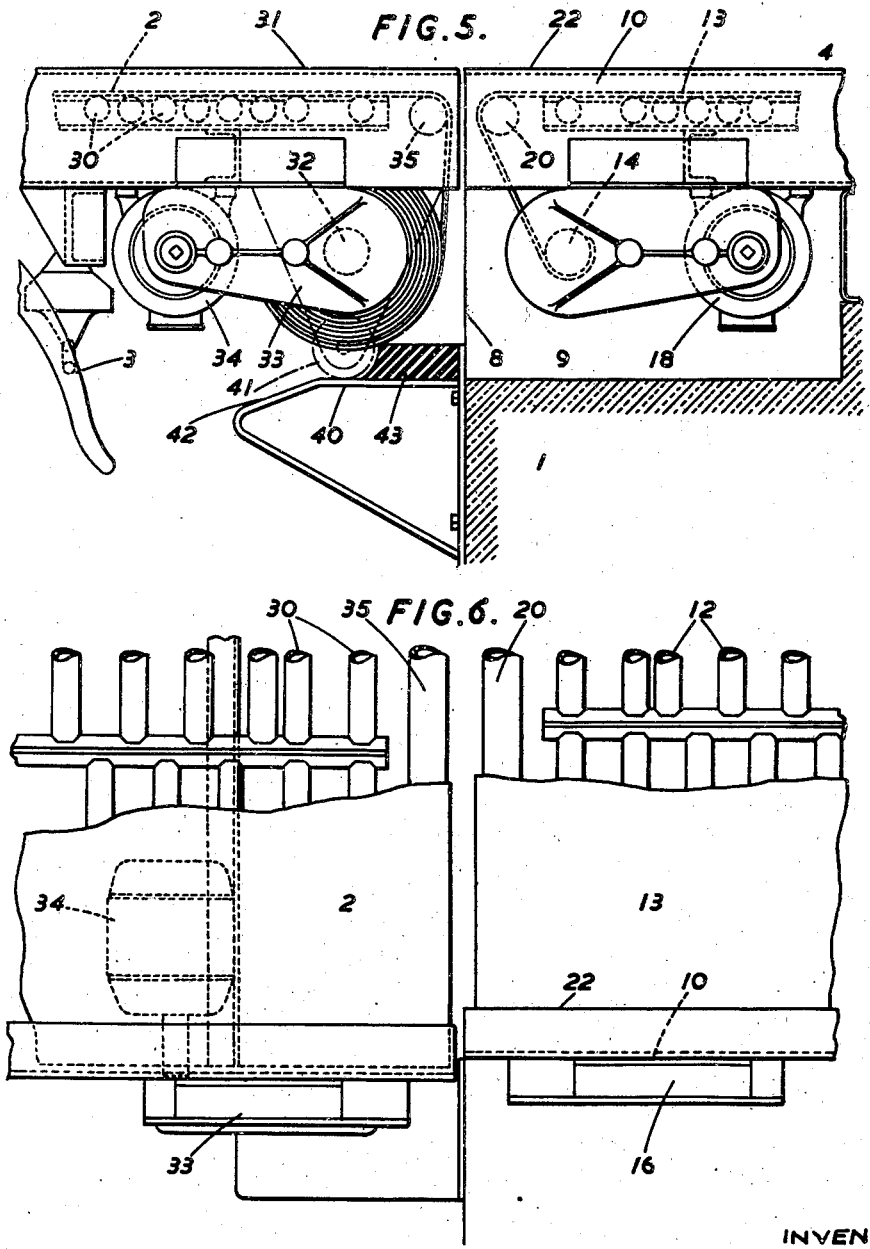

Patented Oct. 22, 1946

2,409,870

UNITED STATES PATENT OFFICE 2,409,870

APPARATUS FOR LOADING AND UNLOADING MOVING FLOOR VEHICLES

James Aitken Kinnaird, Braiswick, near Colchester, England, assignor to Bromilow and Edwards Limited, Bolton, England Application March 29, 1944, Serial No. 528,584
In Great Britain July 14, 1943

1 Claim. (Cl. 214—38)

This invention relates to apparatus for use in loading and unloading moving floor vehicles, with more especial reference to apparatus intended for transferring cased, boxed or bagged goods, or other bulky articles or packages to or from vehicles having floors of the kind described in patent specification No. 1,970,899 or No. 2,129,796, and particularly lightweight trailer or semitrailer vehicles of the kind described in Patent No. 2,353,948.

Normally, loads of packages or similar bulky articles in transit are arranged in stacks on a loading deck ready for placing on the respective vehicles when they arrive. On arrival a vehicle is run up against the forward edge of the loading deck and the packages are moved or carried by man power from the deck to the vehicle and again stacked on the floor or platform of the vehicle. In loading a vehicle having a fixed floor some of the packages are moved or carried to the front or to one side of the vehicle floor, the others following until the load is complete. Where the vehicle has a longitudinally moving floor according to either of the aforementioned specifications, the packages are moved or carried to the vehicle and placed on the rear end of the floor which is operated to carry the loaded packages an appropriate distance towards the front of the vehicle and at the same time bring a further portion of the floor into position to receive packages, this process being repeated as the loading proceeds until the packages first placed on the floor reach the front of the vehicle and the loading is completed. In the case of vehicles having transversely moving floors as described in patent specification No. 1,970,900 the procedure is similar, but towards the far side of the vehicle, while the procedure which has to be followed when unloading packages from moving floor vehicles will be understood without further description.

The object of the invention is to provide apparatus by means of which moving floor vehicles can be loaded from a loading deck and crated, boxed or bagged goods, or other bulky articles hereinafter referred to as packages, and loads of such packages transferred from the vehicles to the deck, expeditiously and with a minimum use of man-power.

Further and favourable objects will appear from the following description.

According to the present invention a loading deck for the purpose specified includes a conveyor or moving floor section on which packages to be loaded on to the floor of a moving floor vehicle are stacked or arranged, and adjacent the forward end of which section one end of the moving floor of the vehicle to be loaded will be positioned, the floor of such vehicle and the moving floor section of the deck being aligned so that the one forms in effect a continuation of the other, whereby on the moving floor section of the deck and the floor of the vehicle being synchronously operated the load on the said section will be transferred automatically to the floor of the vehicle. Conversely when a vehicle is to be unloaded, by synchronously operating the vehicle floor and deck section in the reverse direction the load carried by the vehicle will be transferred automatically to the deck section.

The deck section, conveyor or moving floor and the vehicle floor are preferably power-driven, conveniently electrically, and in unison from a single control, with provision also for hand actuation if desired or in the case of failure of the current. The deck section is a facsimile of the vehicle floor but mounted in the loading deck which may include several such sections.

Advantageously, means are furnished for maintaining the front end of the moving floor deck section and the end of the vehicle floor which is adjacent to it at the same level during loading and unloading of the vehicle, thereby overcoming the effect of variations in the flexure of the vehicle springs which would otherwise occur as the loading of the vehicle changes.

Further, in contradistinction to the embodiments of moving floor illustrated in the aforementioned specifications all of which exhibit downwardly inclined portions at the loading or unloading end, the full run of both the conveyer and moving vehicle floor is horizontal, one forming a straight continuation of the other with the adjacent ends so devised that the gap between the belts is substantially eliminated.

The invention will be further described with reference to the accompanying explanatory drawings which illustrate by way of example embodiments of apparatus for transferring packaged goods to and from movable floor vehicles.

Figure 2:
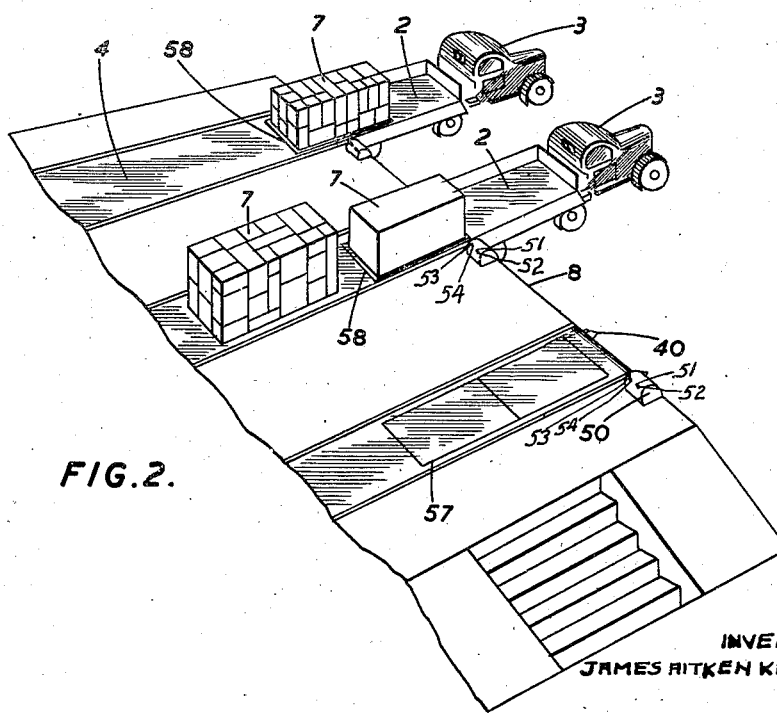

In the drawings:

Figs. 1 and 2 are pictorial representations more or less diagrammatic of loading decks each equipped with these conveyers or movable deck sections for the transfer of goods to or from moving floor vehicles for loading or discharge as the case may be:

Fig. 3 is a longitudinal sectional view of a preferred embodiment of electrically driven conveyer or movable deck section and Fig. 4 is a cross sectional view thereof showing the protecting lip for the edge of the band or belt, while Figs. 5 and 6 are respectively a detail sectional view and a detail plan view of an end-loading moving floor vehicle in position against a movable deck section say of the loading deck illustrated in either Fig. 1 or Fig. 2 for the transfer of goods from one to the other, i. e. for loading or discharge.

Referring now to the drawings but first more particularly to Figs. 1 and 2, the loading deck generally designated 1 comprises a structure raised approximately to the height of the body floors or platforms generally designated 2 of the vehicles 3 with which the loading deck is to co-operate, Fig. 1 showing a standard four-wheeled vehicle in position against the loading deck and Fig. 2 showing vehicles of the semi-trailer type.

Both loading decks represented are shown furnished by way of example with three conveyers or movable deck sections designated 4 which may be arranged to pass the goods from a warehouse, manufactory, rail-head despatch or sorting department or other location 6 to the loading deck 1, preferably under a roof or canopy 5 for transfer to the road vehicles 3.

Each conveyer or movable deck section 4 comprises a belt adapted to be power driven to move packaged goods such as are represented at 7 in Fig. 2 forwardly towards the front edge 8 of the loading deck for transfer to the floors 2 of the vehicles 3 or rearwardly when unloading such vehicles, and in the embodiment of movable deck section represented in Figs. 4 and 5 the preferred form of conveyer 4 is illustrated which is virtually a facsimile of the moving floor structure employed on the vehicles 3 except that instead of being carried by the vehicle chassis it is recessed into the loading deck 1 so that its supporting surface is substantially flush therewith.

Referring to Figs. 3 and 4 it will be seen that the concrete or other material comprising the deck 1 is formed with a longitudinal cavity 9 accommodating main longitudinal members 10 of the movable deck section which rest on cross members 11 seated in the body of the deck 1 and carrying a series of supporting rollers 12 for a flexible band 13 constituting the conveyer or moving deck section proper. Conveniently there are three rows of rollers 13 with the rollers of each row staggered in relation to those of adjacent rows as described in patent specification 1,970,899 aforementioned and conveniently also the ends of the flexible band 13 are mounted on front and rear drums 14 and 15 operated through gearboxes 16 and 17 respectively by electric motors 18 and 19 slung from the main longitudinals 10 and housed underneath the floor in the cavity 9 in the loading deck 1, the arrangement being such that as the motor 18 is operated to wind the band 13 on the drum 14 the band moves forwardly towards the front edge 8 of the loading deck, while conversely, when the motor 19 is operated to wind the band on the drum 15 it is moved rearwardly away from such edge and takes with it any stacks of packed goods such as 7 resting on its surface and supported by the rollers 12 carrying the band.

In contradistinction to the specific embodiments of moving floor described and illustrated in the aforementioned specification 1,970,899 the portions of the flexible band 13 constituting the ends of the movable floor section 4 form horizontal continuations of the main run of the movable floor, such ends being supported by end rollers 20 and 21 borne by the longitudinals 10, extending for the full width of the band and having their supporting surface in the same horizontal plane as that of the supporting rollers 12 for the purpose hereafter explained with reference to Figs. 5 and 6, while the band 13 runs downwardly and inwardly from such end rollers 20 and 21 to their respective winding drums 14 and 15.

The longitudinals 10 have upper inwardly directed flanges 22 flush with the deck surface forming protecting lips for the edges of the band 13.

As will be appreciated, the loading deck with its conveyers or movable deck sections 4 may be utilized with any appropriate moving floor vehicles, but especial advantage results where the movable floor of the vehicle is designed for cooperation with the loading deck. Such an arrangement is illustrated in Figs. 5 and 6 where 1 again represents the loading deck, 4 the movable deck section, 8 the front edge of the deck, 10 the main longitudinals of the deck section co-terminous with such front edge, 13 the flexible band of the movable deck section, 14 its front winding drum and 18 its driving motor. In these figures, 2 also represents the body floor of the vehicle 3, such floor comprising a flexible band supported by rollers 30 carried by a body subframe 31 and having a rear end winding drum 32 operated through a gearbox 33 by an electric motor 34 slung from the subframe 31, the body floor 2 as is the case with the moving deck section 4 being again designed so that instead of its end falling away to the winding drum, it forms a horizontal continuation of the parts supported by the rollers 30 running over the transversely extending end roller 35 and thence down to the end drum 32. By this arrangement when the vehicle is properly positioned against the loading deck there is a minimum gap between the movable deck section 4 and the adjacent movable floor 2 and no obstruction to the transfer of goods from the one to the other.

For maintaining the adjacent ends of the two moving floor sections at the same level during loading and discharge, notwithstanding the variable load on the springs of the vehicle 3, a supporting member 40 is furnished on the front edge 8 of the loading deck 1 and with which member a guide roll 41 on the tail end of the body subframe 31 co-operates as the vehicle is backed up against the loading deck to bring the vehicle body subframe 31 into accurate horizontal alignment with the frame 10 of the loading deck, thus assuring that the two flexible bands are in horizontal alignment and virtually constitute a smooth continuation one of the other. Further, to cover the contingency of the vehicle being partially or fully loaded when it is backed against the deck, the support member 40 is formed with an inclined runway 42 up which the roller 41 rides thus to lift the body floor 2 to the requisite position and preferably also a flexible abutment or cushion 43, say of india rubber, may be furnished to constitute a limit stop preventing contact between the rigid parts of the back of the vehicle 2 and the loading deck 1.

If desired, to suit the loading decks for use with vehicles having body floors or platforms 2 at different heights above road level, the movable deck section frames may be adjustably carried by screw jacks or power actuated rams.

Synchronised movement of the vehicle floor 2 and movable deck section 4 when loading or discharging may be assured by operating them in unison from a single control such as that afforded by the control panels 50 shown associated with each movable deck section 4 in Figs. 1 and 2.

Each control panel 50 mounts a pair of loading switches 51 for the deck section 4 and 52 for the body floor 2, and a pair of unloading switches 53 and 54 or a single pair of push buttons may be mounted on a change-over switch selectively connectable in the control circuits of either the forward loading motors or the rearward discharging motors 19 and 34, the arrangement being such that at least the vehicle floor can be operated independently so that should a vehicle be brought to the loading deck with its floor in an incorrect position for loading, such floor may be moved into its proper position before the synchronous movement of both floors is commenced for the purpose of transferring the load on to the vehicle, avoiding also the necessity of manipulating the vehicle floor by the hand crank or equivalent. From each panel 50 run flexible leads 55, 56 of a length suitable for coupling to the floor motors at the forward and rear ends of the vehicle. Conveniently the flexible leads would have differently coloured plugs and the sockets on the vehicles would similarly differ in colour to prevent accidental cross connection of the leads, or alternatively the plugs may differ in form or construction and the sockets be complementarily formed so that only the appropriate plug can be inserted in a socket. Further, there may be provided on the panel an indicator lamp adapted to be illuminated when either or both of the leads is or are coupled to the vehicle, and thus warn the persons concerned against moving the vehicle and thereby causing damage to the leads.

To facilitate positioning the vehicle laterally in relation to the deck section, guide channels or runways may be provided for the vehicle wheels, and to ensure that goods stacked on the conveyers 4 will not foul the sides or ends of the vehicle body, loading areas may be clearly marked as at 57 on the upper face of the bands 13 or resort may be had to separate loading mats 58 of the requisite area which would have the additional advantage of reducing the wear and tear on the bands. Furthermore, guide rollers could be furnished at the rear of the body sides and, instead of the conventional tailboard, a pair of hinged flaps one at the rear of each body side could be arranged to form guide walls for the stack passing onto the vehicle floor 2.

What I claim is:

Apparatus for loading and unloading vehicles, comprising the combination with a vehicle having a moving floor conveyor of the type referred to including conveyor winding drums at each end of the conveyor belt and intermediate rows of supporting rollers, of a loading platform having a similar conveyor with which the vehicle conveyor is adapted to be aligned, wherein the adjacent end drums of the two conveyors are positioned below and inwardly of their respective end conveyor supporting rollers so that the full run of both conveyors is horizontal, one forming a straight continuation of the other with a minimum gap therebetween.

JAMES AITKEN KINNAIRD.